United States Patent
Tanaka

[11] 3,759,293
[45] Sept. 18, 1973

[54] SOLENOID VALVE

[76] Inventor: Saburo Tanaka, 132 Chigusashinden, Oosawa-machi, Kimitsu-gun, Japan

[22] Filed: Sept. 24, 1971

[21] Appl. No.: 183,450

[30] Foreign Application Priority Data
Oct. 27, 1970  Japan .............................. 45/106114

[52] U.S. Cl. ...................... 137/598, 251/80, 251/85, 251/120, 251/138, 251/139
[51] Int. Cl. ........................................... F16k 31/02
[58] Field of Search ................. 251/80, 81, 85, 120, 251/129, 138, 139, 141; 137/DIG. 5, 598, 625.65

[56] References Cited
UNITED STATES PATENTS

| | | | |
|---|---|---|---|
| 3,589,391 | 6/1971 | Pagliaro | 251/139 X |
| 3,092,145 | 6/1963 | Brinkel | 251/138 X |
| 3,592,228 | 7/1971 | Kukuminato | 137/598 |
| 2,157,480 | 5/1939 | Cole | 251/139 |

*Primary Examiner*—Alan Cohan
*Assistant Examiner*—Gerald A. Michalsky
*Attorney*—Frank J. Jordan

[57] ABSTRACT

A solenoid valve installed between the master cylinder and the wheel cylinder of a motor vehicle and used for controlling the fluid flowing therebetween is characterized in that the valve chest formed in the center of the valve body has a cylinder therein movable in the axial direction by the force of coil excitation. A shock absorber made of a non-magnetic material is incorporated both into the top part of the movable cylinder having the function of adjusting the secondary liquid pressure and into the part with which the bottom surface of said movable cylinder is brought into contact so that said shock absorber may not interfere with the fluid flowing through its passage. The movable cylinder is driven to have its bottom come in contact with said counterpart by way of said shock absorbing members whereby the shock produced at the contact surface is effectively absorbed, the shock or impact sound is minimized, the valve action is smoothed, and the life of the valve is extended.

2 Claims, 9 Drawing Figures

3,759,293

3,759,293

SOLENOID VALVE

BACKGROUND OF THE INVENTION

1. Field of the Invention

This invention relates to solenoid valves installed between the master cylinder and the wheel cylinder of motor vehicles.

2. Description of the Prior Art

The solenoid valve in the prior art has normally the construction as shown in FIG. 1. In this type of solenoid valve, misoperation is often brought about because the contact area between the top surface of seat 101 of movable cylinder 103 and the bottom surface of primary side joint member 102 located above said movable cylinder 103 is so large that the metallic members are strongly affected by the residual magnetism due to excitation of the coil, to make said movable cylinder 103 stick to said joint member 102. Furthermore a heavy shock is produced when said movable cylinder hits the secondary side cylinder 104. This shock is accompanied by sound and vibration and causes wear or deformation in the contact areas between said cylinders 103 and 104.

BRIEF DESCRIPTION OF THE INVENTION

In view of the foregoing, a general object of this invention is to provide a solenoid valve in which a shock absorbing pipe sleeve made of a non-magnetic material is coupled with the top opening of a movable cylinder moved, when the coil is excited, in the valve chest located in the center of the valve body. The open edge of said shock absorbing pipe is joined to the sleeve of the center port of the primary side joint metal member, a shock absorbing ring made of a non-magnetic material is disposed on the top surface of the secondary side cylinder, which top surface is brought into contact with the bottom surface of the movable cylinder, and thus the vertical movement of said movable cylinder is shock-absorbingly supported by said shock absorbing members.

Another object of this invention is to provide a solenoid valve in which the non-magnetic shock absorbing pipe sleeve disposed at the top of the movable cylinder, and the non-magnetic shock absorbing ring disposed on the surface which is to be in contact with the bottom surface of said movable cylinder are used whereby said movable cylinder is smoothly moved free of the influence of the residual magnetism.

Another object of this invention is to provide a solenoid valve in which the non-magnetic shock absorbing members disposed on the top and bottom surfaces of the movable cylinder are used whereby the shock sound produced when said movable cylinder is brought into contact with the opposite surface is removed, wear and deformation in the contact areas of said movable cylinder are minimized, and the life of the valve is extended.

Another object of this invention is to provide a solenoid valve in which the non-magnetic shock absorbing pipe sleeve and ring can be easily produced at a low cost and incorporated into the movable cylinder of the conventional solenoid valve.

DETAILED DESCRIPTION OF THE INVENTION

Figure 1:
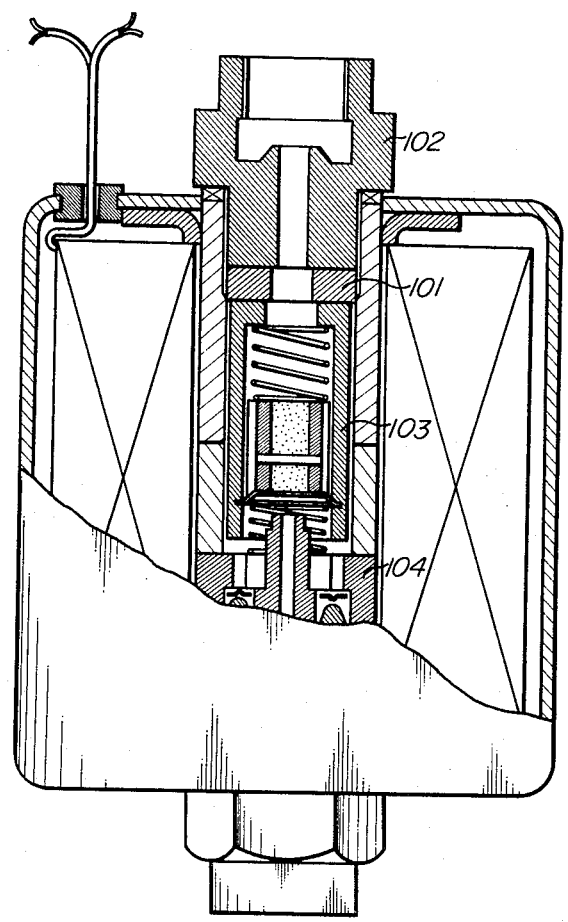
FIG. 1 is a longitudinal sectional view showing the essential parts of a conventional solenoid valve.
Figure 2:
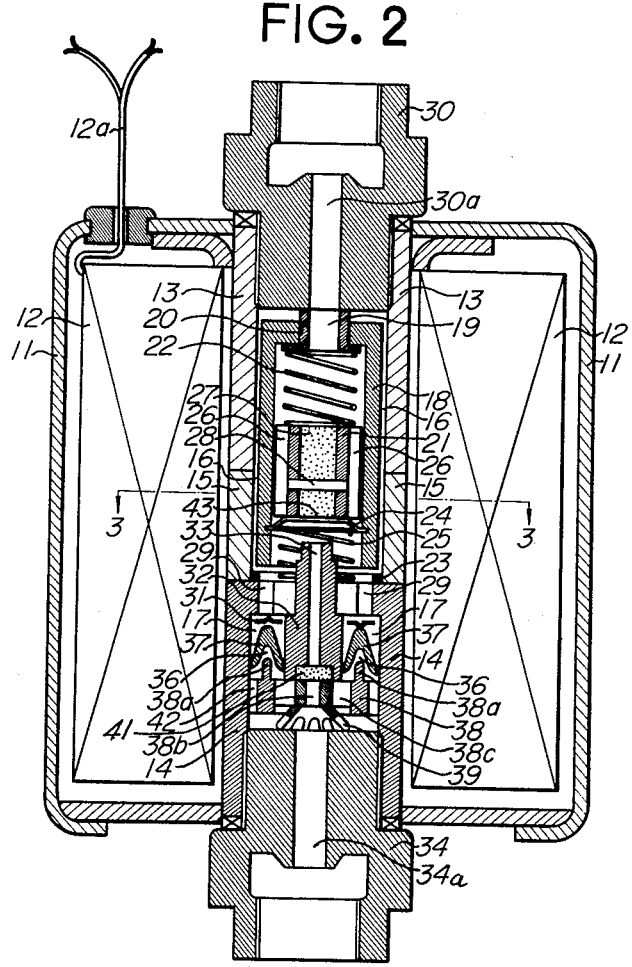
FIG. 2 is a longitudinal sectional view showing a solenoid valve embodying this invention.
Figure 3:
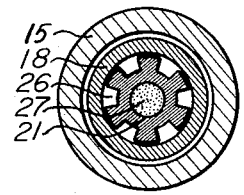
FIG. 3 is a lateral sectional view taken across line 3—3 in FIG. 2.
Figure 4:
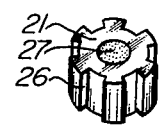
FIG. 4 is a perspective view showing a poppet.
Figure 5:
FIG. 5 is a perspective view showing a shock absorbing pipe sleeve.
Figure 6:
FIG. 6 is a perspective view showing a shock absorbing ring.
Figure 7:
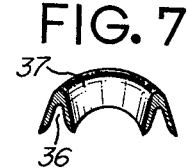
FIG. 7 is a perspective view showing a V-shaped stop packing.
Figure 9:
FIG. 9 is a perspective view showing a washer with radial legs.
Figure 8:
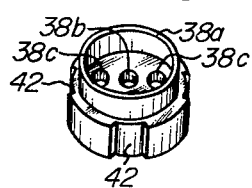
FIG. 8 is a perspective view showing a coupling member.

Referring to FIG. 2, there is shown the internal construction of a solenoid valve of this invention wherein an electromagnetic coil 12 is incorporated into a valve housing 11, a power source (not shown) is connected to the coil via a suitable wiring 12a, and a primary side cylinder 13 and a secondary side cylinder 14 are connected to each other integrally with a connecting cylinder 15 and installed in the center of said electromagnetic coil 12.

Suitable metal members 30 and 34 are hermetically secured in the opening of said valve box 11 by means of screw, drive or the like. Bores 30a and 34a to the cylinder are disposed in the center of said members 30 and 34 respectively. An internal valve chest 16 formed by said primary side cylinder 13 and connecting cyliner 15 communicates with an internal valve chest 17 of secondary side cylinder 14 by way of a port 29 bored on the upper wall of said secondary side cylinder 14. A movable cylinder 18 driven by the magnetic force produced in the coil when excited is disposed in said valve chest 16. An end of a shock absorbing pipe 20 made of a non-magnetic material coupled with the top part of said movable cylinder 18 is projected slightly above the top surface of said cylinder. It is so arranged that only said end of pipe 20 comes in contact with the joint member 30 under the condition that the opening 19 of pipe 20 is coincident with the bore 30a of primary side joint member 30 when the movable cylinder 18 is moved upward.

A longitudinal groove 26 is disposed on the inner wall of said movable cylinder 18, and a poppet 21 having an elastic filler member 27 packed in its center portion is supported by a support frame 24 disposed in the cylinder. A spring 22 is disposed between the top of said poppet and the internal end of the shock absorbing pipe 20 which projects above the upper wall of the movable cylinder 18. This spring serves to maintain the upper end of said pipe 20 always above the top surface of said movable cylinder 18 and to push the poppet 21 toward the support frame 24.

Said filler member 27 packed in the poppet 21 is secured therein by a pin 28 which extends in the diametric direction at a suitable location on the poppet 21.

Another spring (25) is disposed between the support frame 24 which supports said poppet 21 and the top surface of said secondary side cylinder 14. This spring serves to push the movable cylinder 18 always toward the primary side bore by way of the support frame 24.

A bore 29 communicating with the valve chest 16 of primary side cylinder is disposed in the secondary side cylinder 14. Also, a choke pipe 32 having its open end with a center hole 33 projected into said valve chest 16 is disposed in the center of said secondary side cylinder 14. A shock absorbing ring 23 made of a non-magnetic material is disposed on the top of said secondary side cylinder 14 so that this ring is located outside the opening of the bore 29 so as not to obstruct the latter. When said movable cylinder 18 comes down by the force of coil 12 when excited, a surface 43 of said filler member 27 of poppet 21 closes the center hole 33 of said choke pipe 32 and, at the same time, the lower edge of the movable cylinder 18 comes in contact with said shock absorbing ring 23. In this manner the movable cylinder is shock-absorbingly supported.

A collar-shaped packing plate 31 fitted to the lower opening of the bore 29, and a stop packing 37 with a V-shaped section and a top surface which is in contact with the bottom surface of said packing plate 31, are disposed inside the valve chest 17 of said secondary side cylinder. An internal groove 36 of said stop packing 37 is supported from the lower direction by the cylinder frame 38a which projects annularly above the top surface of a coupling plate 38. When a pressure is applied from the primary side, the inner and outer sides of said stop packing 37 come near to each other, thereby forming a fluid passage in the valve chest 17. While, when a pressure is applied from the secondary side, the inner and outer sides of the packing 37 are expanded outwardly, thereby closing the fluid passage in the valve chest. A center hole 38b and a suitable number of bores 38c and grooves 42 are disposed on said coupling plate 38. The lower part of said center hole 38b communicates with the center hole 33 of said choke pipe 32 via a filter part 41. The lower part of said center hole 38b communicates with the bore 34a of secondary side joint metal member 34 via a washer 39 having radial legs.

In the solenoid valve having the foregoing structure, when a liquid pressure is applied from the primary side under the condition when current is supplied to the coil 12, the fluid entering the movable cylinder 18 from the bore 30a via the pipe end 19 passes through the gap between the inner wall of the movable cylinder 18 and the longitudinal groove 26 disposed on the outer wall of said poppet 21. While passing through the gap, the fluid is separated into two parts; one part enters the secondary side valve chest 17 via bore 29 and passes around the stop packing 37 and reaches the bore 34a by way of the through holes 38c of said coupling plate 38 or the gap of said groove 42 and the washer 39 with radial legs. The other part passes through the center hole 33 of the choke pipe 32 which has its opening in the movable cylinder 18 and enters the opening in washer 39 and reaches the bore 34a of said secondary side joint member 34. These two streams are combined together to communicate with the secondary side without limiting the flow from the primary side.

When a current is supplied to the electromagnetic coil 12 under the above condition, the movable cylinder 18 is moved downward in the internal valve chest 16 of the primary side cylinder 13 and the connecting cylinder 15 against the force of the spring 25. The poppet 21 supported by the support 24 inside the movable cylinder 18 is also moved together with said cylinder 18. As a result, the surface 43 of the filler member 27 closes the opening of the center hole 33 of said choke pipe 32 projecting from the secondary side valve chest, to shut off the fluid passage.

The poppet 21 does not release the closed state even when the primary side liquid pressure is lowered, unless the liquid pressure applied to the surface 43 of the poppet in contact with the opening of the center hole 33 exceeds the force of the spring 22 which presses the poppet 21. When the liquid pressure is lowered on the primary side, the pressure on the secondary side is increased. As a result, both sides of the stop packing 37 in the secondary side valve chest 17 are opened, to close the gap of the fluid passage in the valve chest 17. Therefore the liquid pressure on the secondary side is securely maintained.

If, by some reason, the liquid pressure on the secondary side is increased so that the pressure applied to the surface 43 of the poppet exceeds the force of the spring 22, the poppet 21 is automatically raised against the force of the spring 22 to form a gap in the closed area of the center hole 33 of the choke pipe 32, thereby immediately releasing the liquid pressure to the primary side and thus adjusting the liquid pressure on the secondary side. In other words, the poppet 21 disposed inside the movable cylinder 18 serves also as a release valve.

When the current supply to the electromagnetic coil 12 is stopped, the movable cylinder 18 and the poppet 21 in combination are immediately pushed upward by the force of the spring 25 whereby the center hole 33 of the choke pipe 32 is opened. On the other hand, the stop packing 37 continues to close the secondary side valve chest 17. As a consequence, the secondary liquid pressure becomes dependent only upon the liquid flowing through the center hole 33 of the choke pipe 32 by way of the center hole 38b of the coupling plate 38 and the filter part 41. The return flow is constricted and, hence, the return action becomes very slow.

As described above, the solenoid valve of this invention is intended for use with the control mechanism of motor vehicle where, for example, the primary side of the valve is connected to the master cylinder, and the secondary side to the wheel cylinder. In this use, the secondary liquid pressure is securely maintained by virtue of the stop packing 37. Therefore, if the internal pressure of the master cylinder on the primary side is reduced to zero, the internal pressure of the wheel cylinder on the secondary side remains unchanged. Assume that the foot is off the brake pedal when the car is stopped on an uphill road. Even in such event, there is no possibility of causing the car to move back. According to this invention, the known device for automatically releasing the secondary side pressure by the use of electrical means in combination with the clutch or the like may be used.

In the prior art, when the car is braked urgently, an excessive pressure is applied to both the primary and secondary sides resulting in quick wear of packing, etc. Whereas, according to the invention, the pressure applied to the pressing surface 43 exceeds the force of the spring 22 when the secondary liquid pressure is increased, and thus the poppet 21 is raised, the liquid pressure is released to the primary side, and the secondary liquid pressure is automatically adjusted at all times. This function serves to prevent wear or deformation of the associated parts.

The movable cylinder 18 is moved up and down slidably along the inner wall of the valve chest 16 by the electromagnetic coil 12 as the current is turned on and off. At each up and down movement, the movable cylinder comes in contact with its upper and lower counterparts. In this operation, the top of the movable cylinder 18 is brought into contact with the counterpart by way of the shock absorbing pipe 20 made of a nonmagnetic material. Similarly, the bottom end of the cylinder 18 comes into contact with the lower counterpart by way of the absorbing ring 23 which made of a nonmagnetic material. As a result, the shock produced therein is effectively absorbed, the life of the valve is extended, misaction of the movable cylinder is eliminated, and smooth operation is maintained.

While the principles of the invention have been described above in connection with a specific embodiment, it is to be clearly understood that this description is made only by way of example and not a s a limitation on the scope of the present invention.

I claim:

1. A solenoid valve having its primary side connected to a master cylinder and its secondary side to a wheel cylinder of a motor vehicle, said solenoid valve comprising:
   a. a valve housing;
   b. an electromagnetic coil disposed in said valve housing;
   c. a primary side cylinder means defining a primary side chest and a secondary side cylinder means defining a secondary side valve chest serially disposed in the central portion of said electromagnetic coil, said secondary side cylinder means having an upper portion having a bore communicating said secondary valve chest with said primary valve chest;
   d. a movable cylinder in said primary side valve chest and slidable axially in the latter to a lower and upper position upon application and termination of current to said electromagnetic coil;
   e. a primary side joint member having a portion extending into said primary side cylinder means and having a central bore in communication with said primary side valve chest;
   f. shock absorbing means made of a non-magnetic material disposed in said movable cylinder and having an end portion projecting above the top end of said movable cylinder, said end portion contacting said primary side joint member when said movable cylinder is moved to its upper position;
   g. and a shock absorbing ring made of a non-magnetic material disposed on the upper longitudinally end of said second side cylinder means;
   h. said movable cylinder engaging said shock absorbing ring upon said movable cylinder being moved to its lower position;
   i. a choke pipe in said secondary side valve chest and having a portion projecting through said bore into said primary valve chest, and
   j. a poppet valve mounted in said movable cylinder, said movable cylinder being movable into a position to cause said poppet valve to engage and close off the longitudinal end of said choke pipe before the lower end of said movable cylinder engages said shock-absorbing ring.

2. A solenoid valve according to claim 14 wherein said poppet valve has an elastic material therein which engages said longitudinal end of said choke pipe.

* * * * *